US006628568B1

(12) United States Patent
Mahler et al.

(10) Patent No.: US 6,628,568 B1
(45) Date of Patent: Sep. 30, 2003

(54) SYSTEM AND METHOD FOR VERIFICATION OF ACOUSTIC HORN PERFORMANCE

(75) Inventors: Michael M. Mahler, Hayes, VA (US); David F. Johnston, Yorktown, VA (US); Terry L. Farmer, Kearney, MO (US)

(73) Assignee: BHA Group Holdings, Inc., Kansas City, MO (US)

( * ) Notice: Subject to any disclaimer, the term of this patent is extended or adjusted under 35 U.S.C. 154(b) by 0 days.

(21) Appl. No.: 10/063,098

(22) Filed: Mar. 19, 2002

(51) Int. Cl.[7] .............................................. G01M 19/00
(52) U.S. Cl. .......................................... 367/13; 73/1.82
(58) Field of Search ............................ 367/13; 73/1.82; 381/58

(56) References Cited

U.S. PATENT DOCUMENTS 3,835,254 A 9/1974 Ohasi et al.
4,004,111 A 1/1977 Turlais
4,050,913 A 9/1977 Roach
4,130,023 A * 12/1978 Henricksen .................. 73/647
4,192,977 A 3/1980 Stamm
4,253,962 A 3/1981 Thompson
4,333,028 A 6/1982 Panton
4,865,159 A 9/1989 Jamison
5,054,080 A * 10/1991 Julia et al. .................. 381/165
5,432,755 A 7/1995 Komninos
5,459,699 A 10/1995 Walter
5,500,969 A 3/1996 Bonislawski, Jr.
5,636,982 A * 6/1997 Santschi et al. .............. 432/77
5,676,015 A 10/1997 Sheen et al.
5,961,693 A 10/1999 Altman et al.
6,058,076 A 5/2000 Komninos
6,079,275 A 6/2000 Komninos
6,096,118 A 8/2000 Altman et al.
6,163,504 A 12/2000 Komninos

* cited by examiner

*Primary Examiner*—Ian J. Lobo
(74) *Attorney, Agent, or Firm*—Blackwell Sanders Peper Martin, LLP; Greg Strugalski

(57) ABSTRACT

A system and method for verification of acoustic horn performance is disclosed. This system and method includes a pressure detecting mechanism that converts at least one vibratory sound energy pulse, which is followed by at least one vacuum pulse or at least one negative pressure pulse, into a signal that is proportional to a level of sound energy, and the pressure detecting mechanism is operable to be connected to an acoustic horn. There is a measurement device that measures a value that correlates to the signal that is proportional to a level of sound energy and is electrically connected to the pressure detecting mechanism.

34 Claims, 1 Drawing Sheet

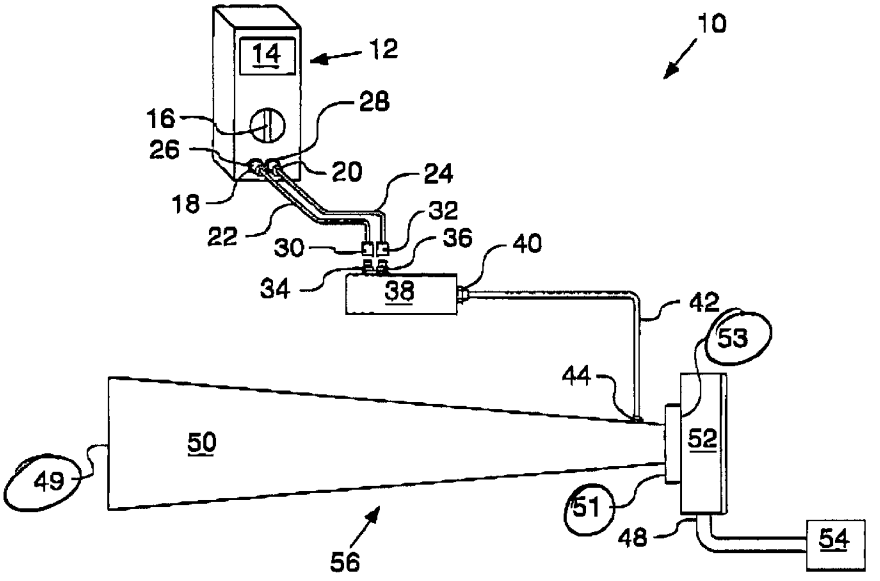
10
12
14
16
28
26
20
18
24
22
32
30
36
40
34
38
42
53
44
52
50
49
51
48
54
56

SYSTEM AND METHOD FOR VERIFICATION OF ACOUSTIC HORN PERFORMANCE

BACKGROUND OF INVENTION

This invention relates to acoustic horns, and more particularly, to an apparatus and method for verification of acoustic horn performance.

An acoustic horn is a gas operated device that produces low frequency, e.g., 60 Hertz to 300 Hertz, high-energy sound waves and is used for cleaning in many industrial applications. The sound waves that are emitted from an acoustic horn resonate and dislodge dust or ash deposits from surfaces. A significant advantage of an acoustic horn is that the acoustic horn can be used to remove dust or debris from locations that are difficult to clean by conventional methods. This includes surfaces that are inaccessible or surfaces that are subject to a high temperature or a high voltage. Therefore, there are numerous applications for acoustic horns. For example, in industrial or utility boilers, acoustic horns are used to clean boiler tubes and heat exchangers. In addition, acoustic horns are often used to clean Selective Catalytic Reduction (SCR) equipment. In these two applications, the acoustic horns are used to supplement or replace conventional steam soot blowers. For industrial, gas pollution, control filters, including electrostatic precipitators and bag houses, acoustic horns are utilized to clean the internal components. In these applications, the acoustic horns are utilized to supplement or replace existing conventional mechanical methods. Acoustic horns are also utilized to clean surfaces associated with material handling operations including collecting hoppers, fans, silos and ductwork.

The intensity at which an acoustic horn operates and its frequency are related to the cleaning effect. There are a number of factors in real world applications that may affect this intensity. These factors include the supply gas pressure and the gas flow. For example, when the supply gas pressure is reduced or the gas piping is restricted, the intensity of the acoustic horn will be reduced. Moreover, when the driver components for the acoustic horn are worn or the acoustic horn malfunctions, then the intensity of the acoustic horn will also be reduced.

There are two common methods for testing the intensity of an acoustic horn. The first method is to measure the supply gas pressure while the acoustic horn is being operated and the second method is to disassemble the driver components associated with the acoustic horn and measure these driver components for wear. Both processes provide a very indirect measurement of intensity. The second process, which involves the disassembly and measurement of the driver components, is very slow and tedious. Also, this second process results in significant downtime for the acoustic horn.

One method for measuring the intensity and frequency of an acoustic horn in real time is by using a microphone. The microphone is placed near the area being cleaned. However, this cleaning is typically accomplished with more than one acoustic horn. When an acoustic horn sounds, the microphone can detect the amplitude and the frequency of the sound. However, a significant problem arises when more than one acoustic horn sounds simultaneously since the microphone cannot differentiate between the two acoustic horns. Also, the measured intensity is a function of the position of the microphone and the surrounding acoustics at that particular location. Moreover, an additional problem is the background noise or vibration that may be present where either the acoustic horn or the microphone is mounted. Furthermore, a microphone cannot measure absolute pressure or a pressure pulse followed by a vacuum pulse or a negative pressure pulse. All of these variables can lead to uncertainty in the measurement process. Since the microphones are located in areas being cleaned from dust and debris, these microphones may potentially be in an atmosphere that is corrosive, dust-laden and/or subject to a high temperature or voltage.

Another problem that arises when utilizing acoustic horns is that since the acoustic horn operates in a dust-laden environment, some of this debris will enter the bell and driver of the acoustic horn. This can be very detrimental to the operation of the acoustic horn. Therefore, purge gas is sometimes supplied to the acoustic horn to pressurize the bell and prevent the accumulation of this material within the acoustic horn. Consequently, it is necessary to know the ambient positive or the negative pressure of the acoustic horn.

The present invention is directed to overcoming one or more of the problems set forth above.

SUMMARY OF INVENTION

In one aspect of this invention, a system for verification of acoustic horn performance is disclosed. This system includes a pressure detecting mechanism that converts at least one vibratory sound energy pulse, which is followed by at least one vacuum pulse or at least one negative pressure pulse, into a signal that is proportional to a level of sound energy, wherein the pressure detecting mechanism is operable to be connected to an acoustic horn.

In another aspect of this invention, a method for verification of acoustic horn performance is disclosed. This method includes operatively connecting an acoustic horn to a pressure detecting mechanism that converts at least one vibratory sound pulse, which is followed by at least one vacuum pulse or at least one negative pressure pulse, to a signal that is proportional to a level of sound energy.

These are merely two illustrative aspects of the present invention and should not be deemed an all-inclusive listing of the innumerable aspects associated with the present invention. These and other aspects will become apparent to those skilled in the art in light of the following disclosure and accompanying drawings.

BRIEF DESCRIPTION OF DRAWINGS

For a better understanding of the present invention, reference may be made to the accompanying drawings.

FIG. 1 is a perspective view of a system of the present invention for verification of acoustic horn performance utilizing a pressure detecting mechanism, e.g., pressure transducer, operable connected to an acoustic horn with an electronic measurement device, e.g., multimeter, for determining a quantity of sound pressure from the pressure detecting mechanism.

DETAILED DESCRIPTION

Referring now to FIG. 1, a perspective diagram of a system of the present system for verification of acoustic horn performance is generally indicated by numeral 10. The acoustic horn 56 includes two main components. The first component is a compressed gas driver 52 and the second component is a bell 50. The bell 50, typically but not necessarily, has a diameter that is relatively small near the compressed gas driver 52 and the diameter gradually increases along the length of the bell 50 towards an opening 49 at the end of the bell 50.

The compressed gas driver 52 is attached to the bell 50 with a flange 51. Contained within the compressed gas driver 52 is a diaphragm plate 53 that is preferably, but not necessarily, made of titanium. Compressed gas is supplied from a compressed gas supply 54, which can include, but is not limited to, any of a wide variety of compressors. The compressed gas supply 54 is connected in fluid relationship to the diaphragm plate 53 by a hose 48. The compressed gas is introduced into the compressed gas driver 52 and pressure builds rapidly causing the diaphragm plate 53 to flex. The gas pressure escapes past the diaphragm plate 53 and into the bell 50, which reduces the gas pressure in the compressed gas driver 52. This pressure reduction in the compressed gas driver 52 causes the diaphragm plate 53 to snap back quickly thereby creating a pressure pulse in the bell 50 that is followed by a vacuum pulse, or in some cases, a negative pressure pulse if negative pressure is usually present in the acoustic horn 56 prior to the introduction of the compressed gas. This vacuum pulse or negative pulse can be measured within the bell 50 and seems to be the strongest near the compressed gas driver 52 and then seems to dissipate in a direction towards the opening 49 at the end of the bell 50. These vacuum pulses or negative pulses are virtually undetectable at the opening 49 at the end of the bell 50.

This cycle is repeated for as long as gas is being supplied to the acoustic horn 56. These pressure pulses travel the length of the bell 50 and emit from the opening 49 of the acoustic horn 56 in the form of strong bursts of acoustic energy capable of dislodging ash or dust deposits. The gas pressure of the pulses near the compressed gas driver 52 is characteristically high where the diameter of the bell 50 is relatively small and the gas pressure of the pulses decreases along the length of the bell 50 as the diameter of the bell 50 increases. Compressed gas is preferably supplied in a range from about 3.51 kilograms per square centimeter gauge (50 p.s.i.g.) to 6.33 kilograms per square centimeter gauge (90 p.s.i.g.) A representative acoustic horn 56 is disclosed in U.S. Pat. No. 5,636,982, which issued to Santschi et al. on Jun. 10, 1997 and is assigned to BHA Group, Inc. and is entitled Method and Apparatus for Acoustically Enhancing Cooling of Clinker, which is incorporated herein by reference.

A pressure transducer 38 is operatively connected to the bell 50 of the acoustic horn 56. This provides a pulse measurement signal when the acoustic horn 56 is being operated to detect high-pressure pulses. There is very little signal that is developed by the concurrent use of more than one acoustic horn 56 in close proximity. This is because the pressure transducer 38 only responds to an absolute pressure pulse followed by either a vacuum pulse or a negative pressure pulse and not the mere presence of ambient sound or vibration so that there is a high signal-to-noise ratio. This high signal-to-noise ratio allows the noise or ambient sound to be filtered out or ignored. Therefore, when the acoustic horn 56 is being operated, the electrical signal generated by the pressure transducer 38 is indicative of the intensity and the frequency of the vibratory sound energy generated by that particular acoustic horn 56. When the acoustic horn 56 is not being operated, the pressure transducer 38 measures the ambient or negative pressure that may be present within the bell 50 of the acoustic horn 56. This is when the acoustic horn 56 is pressurized and supplied with purge gas to remove accumulated debris from the bell 50 of the acoustic horn 56. For this application, a pressure transducer preferably measures pressure pulses between 20 pounds per square inch gauge (−1.41 kilograms per square centimeter gauge) to about +40 pounds per square inch gauge (+2.81 kilograms per square centimeter gauge) and more preferably from about 10 pounds per square inch gauge (−0.703 kilograms per square centimeter gauge) to about +20 pounds per square inch gauge (+1.41 kilograms per square centimeter gauge).

In the preferred embodiment of this present invention, an opening is made in the acoustic horn 56 and a first gas pressure port 44 is installed. The location of this first gas pressure port 44 can be located virtually anywhere along the length of the bell 50, however, a preferred location is 3.81 centimeters (1.5 inches) from the compressed gas driver 52. The size of the opening (not shown) and the associated first gas pressure port 44 depends on the size of the pressure transducer 38. Preferred, but nonlimiting, illustrative diameters include 0.874 centimeters (0.344 inches) for the opening and 0.318 centimeters (0.125 inches) for the first gas pressure port 44. The first gas pressure port 44 is connected in fluid relationship to the pressure transducer 38 through tubing 42. An illustrative, but nonlimiting example of this type of tubing 42 includes tubing such as that supplied by McMaster Carr®. McMaster Carr® is a federally registered trademark of McMaster-Carr Supply Company, having a place of business at 600 County Line Road, P.O. Box 680, Elmhurst, Ill. 60126. An illustrative, but nonlimiting example, includes Model No. 5235K42, having a diameter of 0.318 centimeters (0.125 inches). The preferred material is rubber, however, any of a wide variety of materials will suffice as a conduit for the transmission of sound energy pressure waves. The length of the tubing 42 can vary, with the preferred length being less than 0.61 meters (two (2) feet). Additional length could dampen the pressure pulses to the point where amplification might be required. The tubing 42 is attached to the pressure transducer 38 through a second gas pressure port 40 that is, preferably but not necessarily, substantially similar to the first gas pressure port 44.

An illustrative, but nonlimiting example of a pressure transducer 38 includes those manufactured by SenSym ICT, having a place of business at 1804 McCarthy Boulevard, Milpitas, Calif. 95035, Model SENSYM SDX 30A4, which is a piezo resisitive-type transducer. There is temperature compensation and a high level of output.

A second illustrative, but nonlimiting example of a pressure transducer 38 includes those manufactured by Setra Systems, Inc., e.g., Model Number 2251-ZO6PC-2M-2C-06. Setra Systems, Inc. has a place of business at 159 Swanson Road, Boxborough, Mass. 01719-1304. This pressure transducer 38 preferably has a measurement range from about −1.03 kilogram per square centimeter gauge (14.7 p.s.i.g.) to about +2.48 kilogram per square centimeter gauge (+35.3 p.s.i.g.).

A wide variety of other pressure measurement devices may be substituted for the pressure transducer 38 including pressure sensors both resistive-type, piezo-electric, and capactitive-type sensors. This also includes strain-gauge sensor technology, e.g., silicon.

Preferably, the first gas pressure port 44 and the pressure transducer 38 is located away from an area that is being cleaned by the acoustic horn 56 so that the potentially high temperature, corrosive, dust laden atmosphere is located away from the acoustic horn performance verification system 10.

One way of measuring the pressure from the pressure transducer 38 is through the use of a meter 12. This meter 12 can include any of a wide variety of electronic measurement devices. Illustrative, but nonlimiting, examples of these electronic measurement devices include an oscilloscope to measure the wave shape of the vibratory sound energy. A preferred, but nonlimiting example, of a meter 12 includes a voltmeter or a multimeter that measures voltage. These devices may be incorporated into custom measurement circuits. An example would include a FLUKE® Model 189 True RMS multimeter. FLUKE® is a registered trademark of the Fluke Corporation, having a place of business at 6920 Seaway Boulevard, Everett, Wash. 98203.

There is a myriad of ways for electrically connecting the pressure transducer 38 to the meter 12. The preferred method includes a first female banana jack 34 and a second female banana jack 36 located on the pressure transducer 38 and electrically connected thereto. Moreover, there is also a third female banana jack 18 and a fourth female banana jack 20 located on the meter 12 and electrically connected thereto. In addition, there is a first electrical conductor 22 that includes a first male banana jack 30 that is capable of being inserted within the first female banana jack 34 for the pressure transducer 38 and a second electrical conductor 24 that includes a second male banana jack 32 that is capable of being inserted within the second female banana jack 36 for the pressure transducer 38. The other end of the first electrical conductor 22 includes a third male banana jack 26 that is capable of being inserted within the third female banana jack 18 associated with the meter 12 and other end of the second electrical conductor 24 has a fourth male banana jack 28 that is capable of being inserted within the fourth female banana jack 20 associated with the meter 12. The meter 12, if a multimeter, typically includes a function selector that rotates to different functions such as measuring voltage, current, resistance, and so forth. The meter 12 preferably includes an electronic display and preferably a liquid crystal diode display, however a light emitting diode, cathode ray tube and other types of electronic displays will suffice. A simple analog meter or dial will also provide an indication as to the amount of voltage amplitude or frequency.

The meter 12 is preferably battery-powered when power is not readily available. When the acoustic horn 56 is operated, the intensity of the sound energy can be measured by the meter 12. This can preferably include a RMS value, peak value, minimum value and average value. Also, the frequency of the vibratory sound energy can also be measured. This is optimally performed with an oscilloscope. Measurements preferably occur before and after the application of gas from the compressed gas supply 54 to determine the ambient positive or negative pressure.

Therefore, the acoustic horn verification system 10 accurately measures the intensity and frequency of the vibratory sound energy generated by the acoustic horn 56. The intensity and frequency of the vibratory sound energy generated by the acoustic horn 56 is indicative of the level of performance and the proper operation of the acoustic horn. This measure of performance is substantially independent and unaffected by the use of other acoustic horns 56 in the area as well as background noise and vibration. A major advantage of the acoustic horn verification system 10 is that the measurements can be made outside of the areas being cleaned.

Another significant advantage of the acoustic horn verification system 10 is the accurate measurement of the ambient pressure or negative pressure that is present in the bell 50 of the acoustic horn 56. Since sound pressure measurement can be performed both before and after the operation of the acoustic horn 56, the acoustic horn verification system 10 is not affected by the operation of the acoustic horn 56.

Still another significant advantage of the acoustic horn verification system 10 is that the first gas pressure port 44 can be installed in the field and this system adapts to virtually any type of acoustic horn 56 regardless of the make or manufacturer.

Although the preferred embodiment of the present invention and the method of using the same has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What is claimed is:

1. A system for verification of acoustic horn performance comprising:

a first gas pressure port; and a pressure detecting mechanism that converts at least one vibratory sound energy pulse, which is followed by at least one vacuum pulse or at least one negative pressure pulse, into a signal that is proportional to a level of sound energy, wherein the pressure detecting mechanism is operable to be connected to an acoustic horn;

wherein, said first gas pressure port is located on a bell of said acoustic horn between the throat of said acoustic horn and the opening of said bell for connection of said pressure detecting mechanism.

2. The system according to claim 1, wherein the pressure detecting mechanism can detect changes in pressure in a range from about 20 p.s.i.g. (−1.41 kg.s.cm.g.) to about +40 p.s.i.g. (2.81 kg.s.cm.g.).

3. The system according to claim 1, wherein the pressure detecting mechanism that converts at least one vibratory sound energy pulse is located at a distance from and is operable to be connected to said bell of the acoustic horn using said first gas pressure port.

4. The system according to claim 1, further includes a measurement device that measures a value that correlates to the signal that is proportional to a level of sound energy and is electrically connected to the pressure detecting mechanism.

5. The system according to claim 4, wherein the value that correlates to the signal that is proportional to a level of sound energy includes voltage.

6. The system according to claim 5, wherein the voltage that is measured with the measurement device is selected from a group consisting of RMS value, minimum value, peak value and average value.

7. The system according to claim 4, wherein the value that correlates to the signal that is proportional to a level of sound energy includes frequency.

8. The system according to claim 3, wherein the measurement device that measures a value that correlates to the signal that is proportional to a level of sound energy measurement device is selected from the group that includes a voltmeter, a multimeter, and an oscilloscope.

9. The system according to claim 1, wherein the pressure detecting mechanism includes at least one pressure transducer.

10. The system according to claim 1, wherein the pressure detecting mechanism includes at least one pressure sensor.

11. The system according to claim 10, wherein at least one pressure sensor is selected from the group consisting of a resistance type sensor, a piezo-electric type sensor and a capacitance type sensor.

12. The system according to claim 3, further comprising:

a second gas pressure port that is connected to the pressure detecting mechanism; and a conduit connected between the first gas pressure port and the second gas pressure port.

13. The system according to claim 12, wherein the conduit includes tubing.

14. The system according to claim 4, further includes at least one electrical connection between the pressure detecting mechanism and the measurement device.

15. A system for verification of acoustic horn performance comprising:

a pressure transducer that converts at least one vibratory sound energy pulse, which is followed by at least one vacuum pulse or at least one negative pressure pulse, into a signal that is proportional to a level of sound energy, wherein the pressure transducer is operable to be connected to an acoustic horn; and a gas port located on a bell of said acoustic horn, wherein said gas port provides for the connection of the pressure transducer;

a meter that measures a value that correlates to the signal from the pressure transducer that is proportional to a level of sound energy, wherein the meter is electrically connected to the pressure transducer.

16. The system according to claim 15, wherein the signal from the pressure transducer that is proportional to the level of sound is voltage is selected from a group consisting of RMS value, minimum value, peak value, frequency and average value.

17. A method for verifying acoustic horn performance comprising:

operatively connecting an acoustic horn to a pressure detecting mechanism that converts at least one vibratory sound pulse, which is followed by at least one vacuum pulse or at least one negative pressure pulse, to a signal that is proportional to a level of sound energy, using a gas port located on a bell of said acoustic horn.

18. The method according to claim 17, wherein the pressure detecting mechanism is selected from the group consisting of a pressure transducer and a pressure sensor.

19. The method according to claim 17, further includes measuring a value that correlates to the signal that is proportional to a level of sound energy with a measurement device.

20. The method according to claim 19, further includes operatively connecting the pressure detecting mechanism to a bell of an acoustic horn.

21. A method for verifying acoustic horn performance comprising:

operatively connecting through a gas port located on a bell of an acoustic horn to a detached pressure transducer that converts at least one vibratory sound energy pulse, which is followed by at least one vacuum pulse or at least one negative pressure pulse, into a signal that is proportional to a level of sound energy; and measuring a value that correlates to the signal that is proportional to a level of sound energy to a correlated value with a meter, wherein the meter is electrically connected to the pressure transducer.

22. A system for verifying the performance of an individual acoustic horn in an environment having a plurality of acoustic horns, comprising:

a gas pressure port located on a bell of said individual acoustic horn;

a pressure detecting mechanism; and a conduit connected between said gas pressure port and said pressure detecting mechanism;

wherein activation of said individual acoustic horn generates pressure pulses within said bell;

wherein said pressure detecting mechanism limits sound pickup to said individual acoustic horn by converting a vibratory sound pressure pulse to a signal, when said vibratory sound pressure pulse is immediately followed by at least one vacuum pulse or at least one negative pressure pulse within said bell of said individual acoustic horn, thereby ignoring sounds from other horns that are simultaneously activated.

23. A method for verifying the performance of a particular acoustic horn in an environment having a plurality of acoustic horns, the method comprising:

locating a gas pressure port on a bell of a first acoustic horn at a distance from the throat of said first horn, such that pressure changes occurring during activation of said first horn can be detected at said gas pressure port;

providing a conduit to connect a pressure detecting mechanism to said gas pressure port;

wherein, activation of said first acoustic horn rather than any of the other plurality of horns, causes a vibratory sound pressure pulse followed by at least one vacuum pulse or at least one negative pressure within said bell;

wherein said pressure detecting mechanism responds to the activation of said first horn and converts said vibratory sound pressure to a signal indicative of the intensity and frequency of a vibratory sound generated by said first acoustic horn.

24. The system according to claim 22, wherein the pressure detecting mechanism can detect changes in pressure in a range from about −20 p.s.i.g. (−1.41 kg.s.cm.g.) to about +40 p.s.i.g. (2.81 kg.s.cm.g.).

25. The system according to claim 22, further comprising a measurement device that measures a value that correlates to the signal that is proportional to a level of sound energy and is electrically connected to the pressure detecting mechanism.

26. The system according to claim 25, wherein the value that correlates to the signal that is proportional to a level of sound energy includes voltage.

27. The system according to claim 26, wherein the voltage that is measured with the measurement device is selected from a group consisting of RMS value, minimum value, peak value and average value.

28. The system according to claim 25, wherein the value that correlates to the signal that is proportional to a level of sound energy includes frequency.

29. The system according to claim 25, wherein the measurement device that measures a value that correlates to the signal that is proportional to a level of sound energy measurement device is selected from the group that includes a voltmeter, a multimeter, and an oscilloscope.

30. The system according to claim 22, wherein the pressure detecting mechanism includes at least one pressure transducer.

31. The system according to claim 22, wherein the pressure detecting mechanism includes at least one pressure sensor.

32. The system according to claim 31, wherein at least one pressure sensor is selected from the group consisting of a resistance type sensor, a piezo-electric type sensor and a capacitance type sensor.

33. The system according to claim 22, wherein said conduit includes tubing.

34. The system according to claim 25, further comprises at least one electrical connection between the pressure detecting mechanism and the measurement device.

* * * * *

UNITED STATES PATENT AND TRADEMARK OFFICE

CERTIFICATE OF CORRECTION

PATENT NO. : 6,628,568 B1

DATED : September 30, 2003

INVENTOR(S) : Michael M. Mahler, David F. Johnston and Terry L. Farmer

It is certified that error appears in the above-identified patent and that said Letters Patent is hereby corrected as shown below:

Column 6,
Line 31, delete “about 20 p.s.i.g.” and insert -- about -20 p.s.i.g. --.

Column 7,
Line 25, after “of sound is voltage” insert the word -- and --.

Signed and Sealed this

Thirteenth Day of January, 2004

JON W. DUDAS
*Acting Director of the United States Patent and Trademark Office*